United States Patent [19]
Nie et al.

[11] Patent Number: 5,602,829
[45] Date of Patent: Feb. 11, 1997

[54] METHOD AND APPARATUS FOR ADJUSTING THROUGHPUT OF TRANSMISSION DATA TO BE TRANSMITTED TO NETWORK

[75] Inventors: Hirokazu Nie; Tetsuo Chimoto; Shinji Shihara; Masahiro Kurita, all of Kawasaki, Japan

[73] Assignee: Fujitsu Limited, Kawasaki, Japan

[21] Appl. No.: 619,158

[22] Filed: Mar. 21, 1996

Related U.S. Application Data

[63] Continuation of Ser. No. 490,588, Jun. 15, 1995, abandoned.

[30] Foreign Application Priority Data

Jun. 20, 1994 [JP] Japan ................................ 6-136856

[51] Int. Cl.$^6$ ............................. H04L 12/26; H04L 12/54
[52] U.S. Cl. .......................... 370/235; 370/252; 370/428; 340/825.06; 340/825.51
[58] Field of Search .................................. 370/13, 17, 60, 370/61, 85.6, 85.13, 94.1, 94.3, 60.1, 94.2; 340/825.06, 825.18, 825.5, 825.51; 395/200.13, 200.15, 200.20

[56] References Cited

U.S. PATENT DOCUMENTS

| | | | |
|---|---|---|---|
| 5,285,446 | 2/1994 | Yonehara | 370/60.1 |
| 5,313,454 | 5/1994 | Bustini et al. | 370/13 |
| 5,361,252 | 11/1994 | Sallberg et al. | 370/17 |
| 5,446,733 | 8/1995 | Tsuruoka | 370/60.1 |

FOREIGN PATENT DOCUMENTS

| | | |
|---|---|---|
| 61-142839 | 6/1966 | Japan . |
| 2-209043 | 8/1990 | Japan . |
| 4-22236 | 1/1992 | Japan . |

*Primary Examiner*—Alpus H. Hsu
*Attorney, Agent, or Firm*—Staas & Halsey

[57] ABSTRACT

When a data transmission request is generated, a transmission capable counter indicative of a data length C1 of data which can be transmitted at a certain time point is checked and, when a count value is positive, transmission data Cs is subtracted from the value of the transmission capable counter and a transmitting process is started by a line transmission processing section. When the value C1 of the transmission capable counter is negative or 0, the transmission data is held in a transmission holding data queue. When a fundamental timer times out, if the value C1 of the transmission capable counter is positive, a value C2 of a transmission throughput counter is preset. If the value C1 of the transmission capable counter is negative or 0, the value C2 of the transmission throughput counter is added to the value C1 of the transmission capable counter. Thus, a throughput of the transmission data from the self station is dynamically changed in accordance with a communication capacity and a performance which momently change in a communication network using a frame relay protocol.

16 Claims, 11 Drawing Sheets

C1 : TRANSMISSION CAPABLE COUNTER

C2 : TRANSMISSION THROUGHPUT COUNTER

Cs : TRANSMISSION DATA LENGTH

MAX : MAXIMUM TRANSMISSION THROUGHPUT

CIR : AUTHORIZED INFORMATION SPEED
(LOWEST THROUGHPUT THAT IS GUARANTEED
BY THE NETWORK SIDE IN ORDINARY STATE)

MIN : MINIMUM TRANSMISSION THROUGHPUT

METHOD AND APPARATUS FOR ADJUSTING THROUGHPUT OF TRANSMISSION DATA TO BE TRANSMITTED TO NETWORK

This application is a continuation of application Ser. No. 08/490,588, filed Jun. 15, 1995, now abandoned.

BACKGROUND OF THE INVENTION

The invention relates to control apparatus and method for adjusting a transmission throughput of a data communication through a communication network and, more particularly, to control apparatus and method for adjusting a transmission throughput in a data communication through a communication network of a frame relay/protocol.

In recent years, the development of a communication technique for realizing a data communication by connecting electronic computers or the like through a communication network is remarkable. A new protocol of a high efficiency and a high performance has been developed.

In the conventional communication network, there are a network such as an exclusive-use line or a line exchange network in which the communication performance is fixed and a network such as a packet exchange network like a DDX or an ISDN in which although a communication capacity and a performance change, a data dropout hardly occurs due to a flow control. Namely, in the packet exchange network like a DDX or an ISDN, a communication connection is established between a transmission terminal and a reception terminal by selectively connecting relay points in a communication network, and an error detection correction control and a flow control are executed every data communication between the relay points.

However, in the data communication using the packet exchange network such as DDX or ISDN in which the error detection correction control and flow control are executed, a communication throughput as an actual communication performance is extremely low for a physical communication speed of a communication line due to those control loads. For example, although the maximum physical speed of the DDX is equal to 48 kbps, the actual communication throughput is reduced to about 9600 bps. Although the physical speed of the ISDN is equal to 64 kbps, on the other hand, the actual communication throughput is reduced to about 9600 bps.

There is a frame relay/protocol as a new protocol of a high efficiency and a high performance to solve such a problem of the communication network having the error detection correction control and flow control and to realize a high speed communication. According to the frame relay, although the communication capacity and performance change like a digital packet switching network of the DDX, ISDN, or the like, the network doesn't have the error detection correction control and flow control. Therefore, the control load of the network is low and the high speed exchanging process can be performed. So long as the network is free, a real speed near the maximum physical speed can be obtained and a data communication of a high efficiency and a high performance can be performed.

However, according to the communication network using the frame relay/protocol, although the communication capacity and performance change like the digital packet switching network, since the network doesn't have the error detection correction control and flow control, there are drawbacks such that if the electronic computers or the like connected to the network don't grasp a vergence state of the network and promptly change a transmission throughput, a data dropout easily occurs and a retry of the protocol between the electronic computers or the like connected to the network frequently occurs, so that the communication performance deteriorates.

SUMMARY OF THE INVENTION

According to the invention, there are provided transmission throughput control apparatus and method, in which a throughput of transmission data from a self station is dynamically changed in accordance with a communication capacity and a performance of a communication network using a frame relay/protocol which momently change, thereby preventing a dropout of communication data and obtaining the maximum communication effect.

An apparatus of the invention has a transmission capable counter, a transmission throughput counter, a transmission holding data queue, a transmission judgment control section, and a time-out processing section. The transmission capable counter shows a data length C1 which can be transmitted at the present time point. A fundamental timer sets an updating period of the transmission capable counter and times out every updating period. The transmission throughput counter shows a data length C2 which can be transmitted by a communication network (frame relay/protocol network) between the updating periods of the fundamental timer. The transmission holding queue temporarily holds data which cannot be transmitted. Further, a line transmission processing section outputs transmission data to a physical line of the communication network. When a transmission request is generated, the transmission judgment control section checks the transmission capable counter. When its count value C1 is positive, a data length Cs of the transmission data to which the transmission request was generated is subtracted from the count value of the transmission capable counter, thereby starting the transmitting process by the line transmission processing section. When the value C1 of the transmission capable counter is negative or equal to 0, the transmission data is held in the transmission holding data queue. Namely, according to the invention, the transmission capable counter to indicate the data length which can be transmitted at a certain time point is provided, the transmission capable counter is checked at the time of the transmission, and whether the data is transmitted or the apparatus waits until it can be transmitted is controlled, thereby dynamically changing the transmission throughput.

When the fundamental timer times out, the time-out processing section operates and updates the transmission capable counter and transmits the data held. First, when the value C1 of the transmission capable counter is positive at the time of the timeout, the value C2 of the transmission throughput counter is directly preset into the transmission capable counter. On the other hand, when the value C1 of the transmission capable counter is negative or equal to 0, the value C2 of the transmission throughput counter is updated to (C1+C2) by adding the value C2 to the value C1 of the transmission capable counter. As a result of the updating process, when the value C1 of the transmission capable counter is positive and the transmission data held exists in the transmission holding data queue, the data length of the transmission data having the highest priority in the transmission data held is subtracted from the transmission capable counter, thereby starting the transmitting process by the line transmission processing section. After the data was transmitted to the physical line on the basis of the transmission request, if the transmission data held exists in the transmission holding data queue, the line transmission processing section takes out the transmission data of the highest priority among the transmission data held and starts the transmission independently of the time-out process. At the same time, the data length of the transmission data taken out is subtracted from the transmission capable counter.

In the case where a plurality of communication lines are logically set onto one physical line, since the communication network forms an independent communication connection every line, a plurality of sets each comprising the transmission capable counter, transmission throughput counter, transmission holding data queue, transmission judgment control section, and time-out processing section are provided. Further, a transmission waiting data queue is provided at the front stage of the line transmission processing section. Thus, the transmission throughput can be controlled on a unit basis of a plurality of communication connections. Although the time has fixedly been set to the fundamental timer, the fundamental timer can be replaced to a timer whose set time can be changed and the transmission time of the maximum transmission data length in a unit communication system by the communication network can be also automatically set to the timer value.

A throughput managing section is further provided for the transmission throughput counter. In the case where a high transmission throughput is necessary and the throughput can be increased, or in the case where it is necessary to reduce the transmission throughput as in the case where a vergence notification is received from the communication network or the like, the throughput managing section increases or decreases the value of the transmission throughput counter by a predetermined ratio. The throughput managing section measures information such as vergence notification received from the communication network, the number of retry times for the data dropout due to the vergence, and the like for a designated measurement period of time and can also decide a ratio or value for increasing or decreasing the value of the transmission throughput counter on the basis of the measurement information.

A transmission throughput control method of the invention has the following procedures.

I. Transmission judging step

When a transmission request occurs, the transmission capable counter indicative of the data length C1 which can be transmitted at the present time point is checked. When the value C1 is positive, the data length Cs of the transmission data in which the transmission request was generated is subtracted from the value of the transmission capable counter and the transmitting process is started by the line transmission processing section. When the value C1 of the transmission capable counter is negative or equal to 0, the transmission data is held in the transmission holding data queue.

II. Counter updating step

Every time-out of the fundamental timer to which the updating period was set, when the value C1 of the transmission capable counter is positive, the value C2 of the transmission throughput counter is preset to the transmission capable counter. When the value C1 of the transmission capable counter is negative or equal to 0, the value C2 of the transmission throughput counter is added to the value C1 of the transmission capable counter.

III. Holding data transmitting step

As a result of the process in the counter updating step, when the value C1 of the transmission capable counter is positive and the transmission data held exists in the transmission holding data queue, the data length of the transmission data of the highest priority among the transmission data held is subtracted from the value of the transmission capable counter and the transmitting process is started by the line transmission processing section.

The details of the transmission throughput control method are fundamentally the same as a construction of the apparatus.

According to the invention, the transmission capable counter indicative of the data length which can be transmitted at a certain time point is provided and its count value is checked and whether the data is transmitted or the apparatus waits until it can be transmitted is controlled, so that the transmission throughput can be promptly changed. The transmission capable counter is updated every time-out of the fundamental timer. In such an updating process, when the value of the transmission capable counter is positive, the value of the transmission throughput counter in which the data length that can be transmitted by the communication network at that time has been set is preset to the transmission capable counter. When the value of the transmission capable counter is negative or equal to 0, the addition value of the value of the transmission throughput counter and the value of the transmission capable counter is preset. When the transmission request is generated, the transmission capable counter is checked. When its count value is positive, the data length of the transmission data in which the transmission request was generated is subtracted from the value of the transmission capable counter and the transmitting process is started by the line transmission processing section. In this instance, even when the transmission data length is equal to or larger than the value of the transmission capable counter, the transmitting process is started. However, the value of the transmission capable counter is equal to 0 or a minus value due to the subtraction. The transmission data by the next transmission request is held in the transmission holding data queue. As for the held transmission data, when the value of the transmission capable counter is positive by the updating process of the transmission capable counter that is executed at the time of the time-out of the fundamental timer, the holding transmission data of the highest priority is taken out and its data length is subtracted from the value of the transmission capable counter and is transmitted by the line transmission processing section. In the cases other than the time-out, similar transmission of the holding data and updating of the counter are executed every time of the end of the transmission by the line transmission processing section. Thus, the transmission throughput which traces a state change of the network can be rapidly changed. A data communication of a high efficiency and a high performance can be executed by using the frame relay/protocol network.

The above and other objects, features, and advantages of the present invention will become more apparent from the following detailed description with reference to the drawings.

DETAILED DESCRIPTION OF THE PREFERRED EMBODIMENTS

Figure 1:
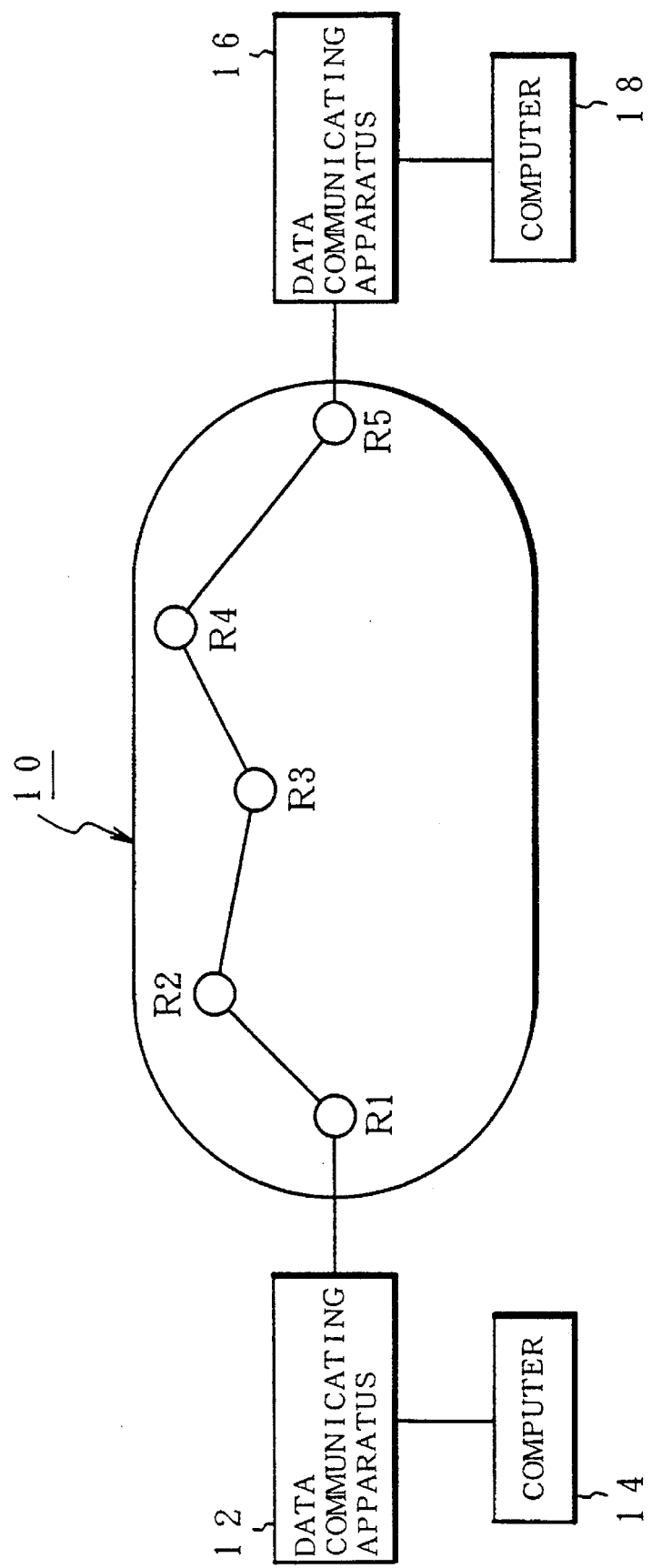
FIG. 1 is a constructional diagram of a network to which the invention is applied.

FIG. 1 is a diagram showing a data communication line using a communication network to which a transmission throughput control apparatus of the invention is applied. A frame relay/network 10 is a communication network using a frame relay/protocol. Although a communication capacity and a performance change as in the digital packet switching network such as DDX, ISDN, etc., a flow control is not performed. For example, a computer 14 is connected as a transmission side to the frame relay/network 10 through a data communicating apparatus 12. On the other hand, a computer 18 is connected as a reception side to the network 10 through a data communicating apparatus 16. A communication connection is established between the data communicating apparatuses 12 and 16 via relay points R1 to R5 in the frame relay/network 10. Since the frame relay/network 10 doesn't perform a flow control, an error detecting and correcting process is not executed in the data transmission among the relay points R1 to R5 in the network. The error correction is executed between the data communicating apparatuses 12 and 16 as transmission and reception terminals connected through the frame relay network 10.

Figure 2:
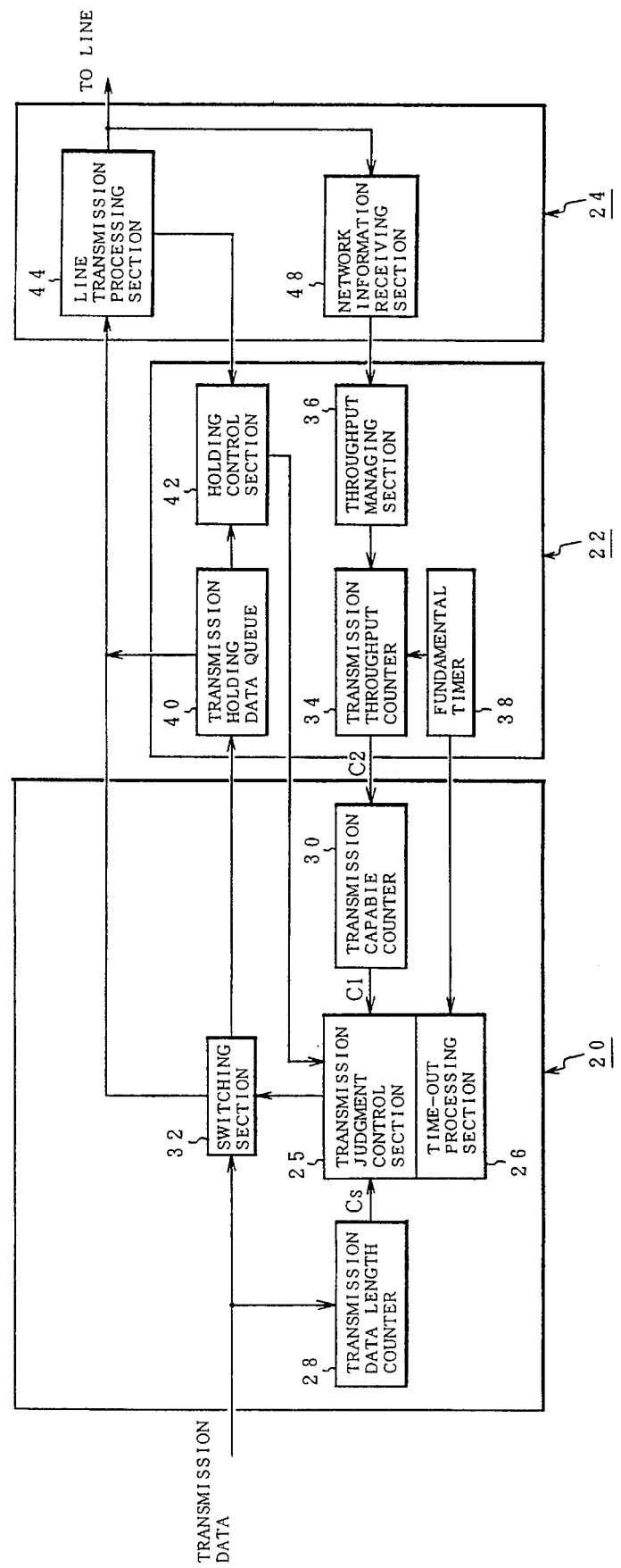
FIG. 2 is a block diagram of an embodiment of the invention.

FIG. 2 shows an embodiment of the transmission throughput control apparatus of the invention provided for the data communicating apparatus 12 on the transmission side in FIG. 1. The transmission throughput control apparatus is constructed by a transmission capable judging section 20, a transmission holding section 22, and a transmission processing section 24. A transmission judgment control section 25, a time-out processing section 26, a transmission data length counter 28, a transmission capable counter 30, and a switching section 32 are provided for the transmission capable judging section 20. A fundamental timer 38, a transmission throughput counter 34, a throughput managing section 36, a transmission holding data queue 40, and a holding control section 42 are provided for the transmission holding section 22. Further, a line transmission processing section 44 and a network information receiving section 48 are provided for the transmission processing section 24. A count value C1 indicative of a data length which can be transmitted at a certain time point has been stored in the transmission capable counter 30 provided for the transmission capable judging section 20. Namely, the value C1 of the transmission capable counter 30 is cleared to 0 by an initialization at the time of the leading of the apparatus and is updated by a control of the time-out processing section 26 on the basis of a time-out output which is obtained after the elapse of a set time which gives an updating period set in the fundamental timer 38 provided for the transmission holding section 22. The updating of the transmission capable counter 30 at the time of the time-out differs in dependence on whether the count value C1 at that time is positive, negative, or 0. When the value C1 of the transmission capable counter 30 is positive, a count value C2 which indicates a data length that can be transmitted and which has been set in the transmission throughput counter 34 is preset. Namely, when the count value C1 of the transmission capable counter 30 is positive, it is replaced to the value C2 of the transmission throughput counter 34 every timeout. On the other hand, when the count value C1 of the transmission capable counter 30 is equal to 0 or is negative, the value (C1+C2) obtained by adding the count value C2 of the transmission throughput counter 34 to the count value C1 of the transmission capable counter 30 at that time is set to a new count value C1. The count value C2 of the counter 34 is set in accordance with a state of a network by the throughput managing section 36. Reception information of a vergence state sent from the network is given to the throughput managing section 36 from the network information receiving section 48 provided for the transmission processing section 24. The vergence state of the network can be recognized by the throughput managing section 36. Therefore, the throughput managing section 36 sets the optimum transmission throughput shown by the data length that can be transmitted by the network at that time in accordance with the vergence state of the network.

Further, in the case where a high transmission throughput is necessary and the throughput can be increased, the throughput managing section 36 increases the count value at a predetermined ratio. On the contrary, when it is necessary to reduce the transmission throughput as in the case where a vergence notification of the network is received from the reception information showing the vergence state from the network information receiving section 48 or the like, the throughput managing section 36 has a function to reduce the value of the transmission throughput counter 34 at a predetermined ratio for the elapse of time. For example, when the vergence state is detected, the present transmission throughput is reduced at a predetermined time ratio to the transmission throughput at which the vergence can be recovered. After that, when a vergence cancel notification is received, the value C2 of the transmission throughput counter 34 is increased at a predetermined time ratio without immediately raising the count value C2 to the value of the high transmission throughput.

Further, a throughput managing section 36 can be also constructed in a manner such that information necessary to adjust the transmission throughput is measured for a designated period of time and a time ratio to increase or decrease the value C2 of the transmission throughput counter 34 based on the measurement result or an increase or decrease value per time is determined. For example, the notification of the vergence state received from the network for the designated measurement period of time, the number of retry times of the data communication apparatus for the occurrence of a data dropout due to the vergence, and the like are measured. A ratio or an increase or decrease value to obtain the value C2 of the optimum transmission throughput based on the measurement information is decided. The value of the transmission throughput counter 34 is increased or decreased. Further, when the high transmission throughput is set at the time of the activation of the apparatus, since an influence on the network is large, the throughput managing section 36 can also execute an increasing process of the transmission throughput to increase to the value of the high transmission throughput at a predetermined ratio from the value of the specified transmission throughput upon activation.

The fundamental timer 38 is a timer to decide a counter updating period. A transmission time, for example, one second is fixedly set in the fundamental timer 38 on the basis of the maximum transmission data length in the unit communication system by the communication network. It is also possible to use a timer which can be set from the outside and to automatically set the transmission time of the maximum transmission data length in the unit communication system by the communication network to the timer value at the time of the activation of the apparatus.

When the transmission data based on the transmission request from the computer is sent to the transmission capable judging section 20, a data length Cs is set to the transmission data length counter 28. When a transmission request is received, the transmission judgment control section 25 checks the count value C1 of the transmission capable counter 30 at that time, thereby deciding whether the data is transmitted to the network or is held. When the count value C1 of the counter 30 is positive, the judgment control section 25 sends the transmission data from the switching section 32 to the line transmission processing section 44 of the transmission processing section 24. The data is transmitted to a physical line of the network. In this instance, the value obtained by subtracting the transmission data length Cs from the count value C1 of the counter 30 is set to a new count value C1 of the counter 30. Although the maximum data length which can be transmitted by the network is determined, the data length Cs of the transmission data to be actually transmitted changes within the range of the maximum transmission capable data length of the network in accordance with the necessity. When the count value C1 of the counter 30 is positive, the judgment control section 25 sends it to the line transmission processing section 44 irrespective of whether the transmission data length Cs is shorter or longer than a count value C1 without being aware of it, thereby allowing the network to transmit. On the other hand, when the count value C1 of the counter 30 is equal to 0 or is negative when there is a transmission request, it is judged that it exceeds the present transmission throughput of the network. In such a case, the transmission data is stored in the transmission holding data queue 40 provided for the transmission holding section 22 and the transmission is not executed. In the case where the transmitting process of the preceding transmission data by the line transmission processing section 44 is finished or in the case where the updating process of the transmission capable counter 30 due to the time-up of the fundamental timer 38 is executed, the transmission data held in the transmission holding data queue 40 is transmitted to the network under a condition such that the count value C1 of the counter 30 is positive. When the line transmission processing section 44 finishes the transmitting process of the preceding transmission data to the network, the holding control section 42 receives a transmission end notification and checks the presence or absence of the holding data with reference to the transmission holding data queue 40. When the holding data exists, the count value C1 of the transmission capable counter 30 is checked via the judgment control section 25. In this instance, when the count value C1 is positive, the transmission data of the highest priority among the transmission data held in the transmission holding data queue 40 is taken out and sent to the line transmission processing section 44. The transmission to the network is started. At the same time, a counter updating to set the value obtained by subtracting the data length Cs of the holding transmission data of which the transmission was started from the count value C1 of the transmission capable counter 30 to a new count value C1 is executed.

On the other hand, when the fundamental timer 38 times up, after completion of the updating process of the transmission capable counter 30 using the count value C2 of the transmission throughput counter 34, so long as the holding transmission data exists in the transmission holding data queue 40, the count value C1 of the transmission capable counter 30 after the updating is checked. When the count value C1 is positive at this time, the holding transmission data of the highest priority among those transmission data is taken out and sent to the line transmission processing section 44, thereby starting the transmission to the network. At the same time, the data length Cs of the holding transmission data of which the transmission was started is subtracted from the count value C1 of the counter 30 and the result is set to a new count value C1.

Figure 3:
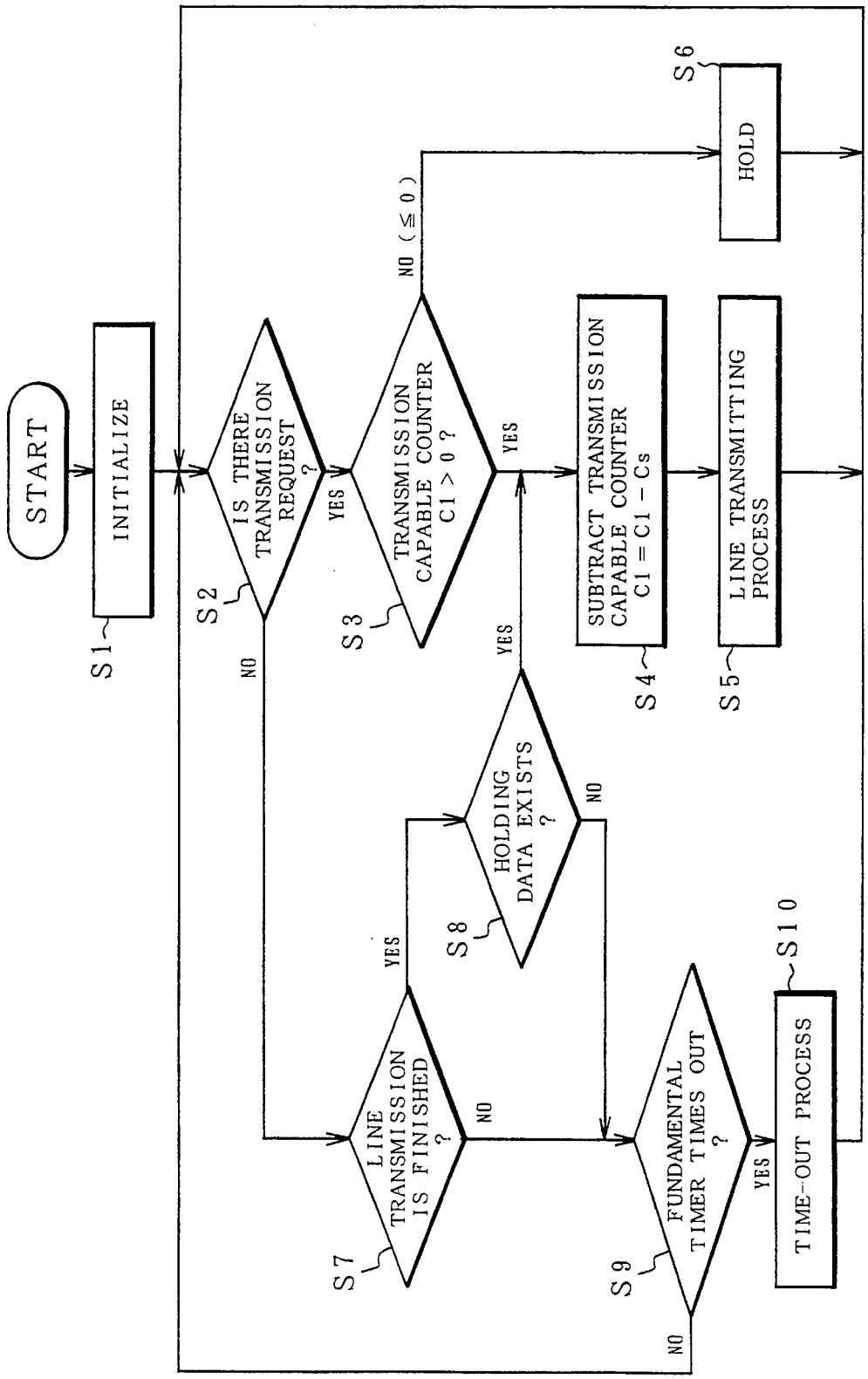
FIG. 3 is a flowchart for the processing operation of the invention.
Figure 4:
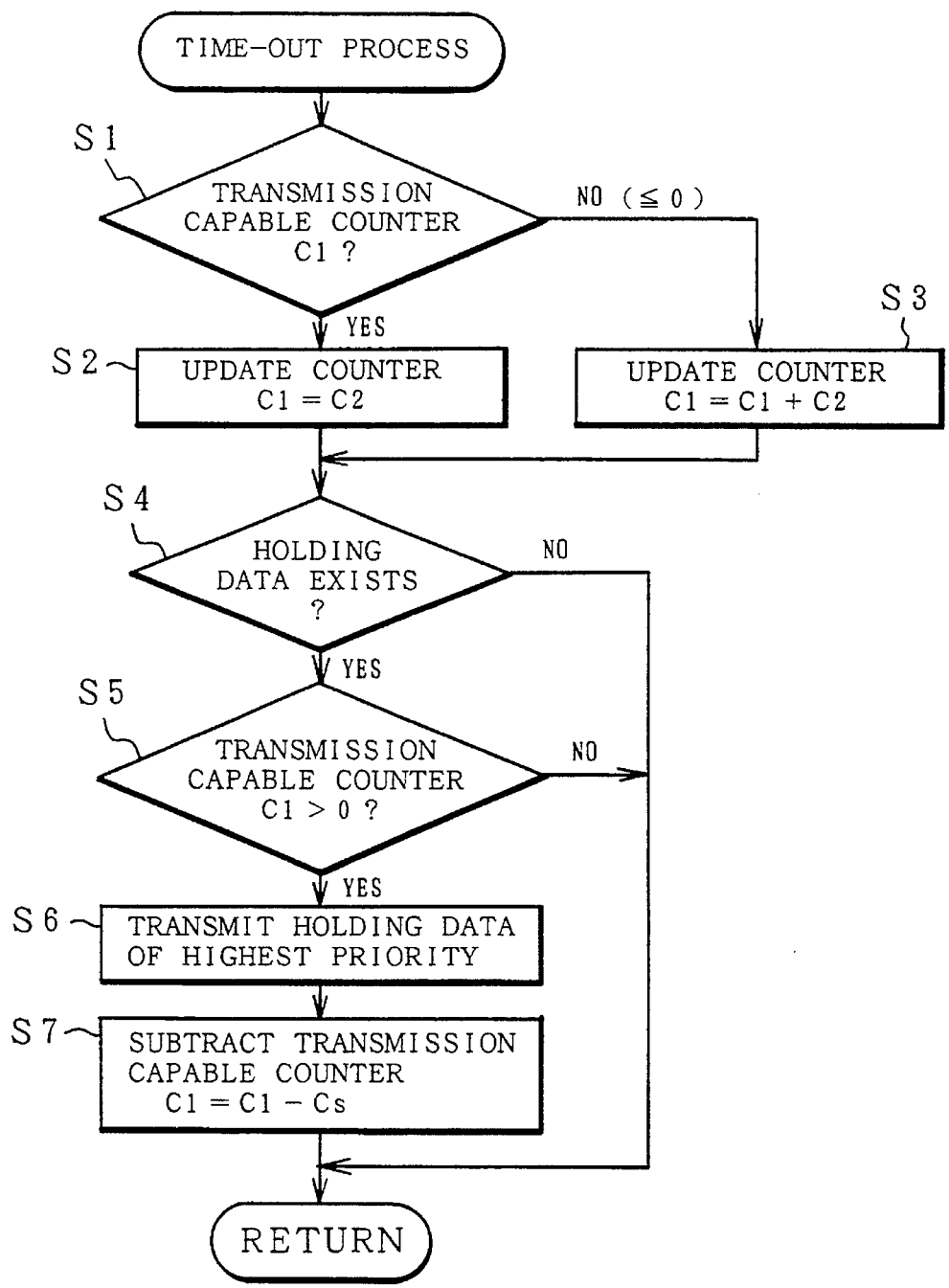
FIG. 4 is a flowchart for a time-out process in FIG. 3.

A flowchart of FIG. 3 relates to the processing operation in the transmission throughput control apparatus in FIG. 2. When the apparatus is activated, the initialization is first executed in step S1. In the initialization, the count value C1 of the transmission capable counter 30, the count value C2 of the transmission throughput counter 34, and further the count value Cs of the transmission data length counter 28 are cleared to 0, respectively. After those count values were cleared, the count value C2 indicative of the data length corresponding to the transmission throughput is set to the transmission throughput counter 34 by the throughput managing section 36 in accordance with the vergence information received from the present network. Further, it is also possible to construct in a manner such that the same value as the count value C2 is preset to the transmission capable counter 30 to thereby set to the count value C1 and, after completion of the initialization, the processing routine advances to the ordinary communicating process. After the initialization in step S1, the presence or absence of a transmission request is checked in step S2. When there is the transmission request, step S3 follows and the count value C1 of the transmission capable counter 30 is checked. When the count value C1 is positive, step S4 follows and the value obtained by subtracting the data length Cs of the transmission data from the count value C1 of the transmission capable counter 30 is set to a new count value C1. In step S5, the transmission data is sent to the line transmission processing section 44 and is transmitted onto the physical line to the network. On the other hand, when the count value C1 of the transmission capable counter 30 is equal to 0 or negative, step S6 follows and the transmission data is stored in the transmission holding data queue 40 and is held. When there is no transmission request in step S2, step S7 follows and a check is made to see if the transmission by the line transmission processing section 44 has been finished or not. If the transmission of the preceding transmission data was finished, step S8 follows and a check is made to see if the holding transmission data exists in the transmission holding data queue 40 or not. When the holding transmission data exists, step S4 follows and the transmission data of the highest priority is taken out and the value obtained by subtracting the data length Cs from the count value C1 of the transmission capable counter 30 is set to a new count value C1. After that, in step S5, the transmitting operation of the holding transmission data is started by the line transmission processing section 44. When the holding transmission data doesn't exist in step S8 or when a line transmission end is not obtained in step S7, step S9 follows and the time-out of the fundamental timer 38 is checked. When the fundamental timer 38 times out, step S10 follows and a time-out process shown as a subroutine in FIG. 4 is executed. When the fundamental timer 38 doesn't time out, the processing routine is returned to step S2.

In the time-out process in FIG. 4, the count value C1 of the transmission capable counter 30 is first checked in step S1. When the count value C1 is positive, step S2 follows and the count value C2 set in the transmission throughput counter 34 at present is preset as a count value C1 of the transmission capable counter 30. On the other hand, when the count value C1 of the counter 30 is equal to 0 or negative, step S3 follows and the value obtained by adding the count value C2 of the throughput that can be transmitted by the present network shown by the transmission throughput counter 34 to the count value C1 of the transmission capable counter 30 having a value of 0 or a negative value is preset as a new count value C1. After completion of the updating of the transmission capable counter 30 in step S2 or S3, step S4 follows and the presence or absence of the holding data is checked. When the holding data exists, the count value C1 of the transmission capable counter 30 after the updating is again checked in step S5. When the count value C1 is positive, step S6 follows and the holding transmission data of the highest priority is taken out and the transmission to the network from the line transmission processing section 44 is started. At the same time, in step S7, the value obtained by subtracting the data length Cs of the holding transmission data of which the transmission is started from the count value C1 of the transmission capable counter 30 is set to a new count value C1. When the holding transmission data doesn't exist in step S4, the processes in steps S5 to S7 are not executed.

Figure 5:
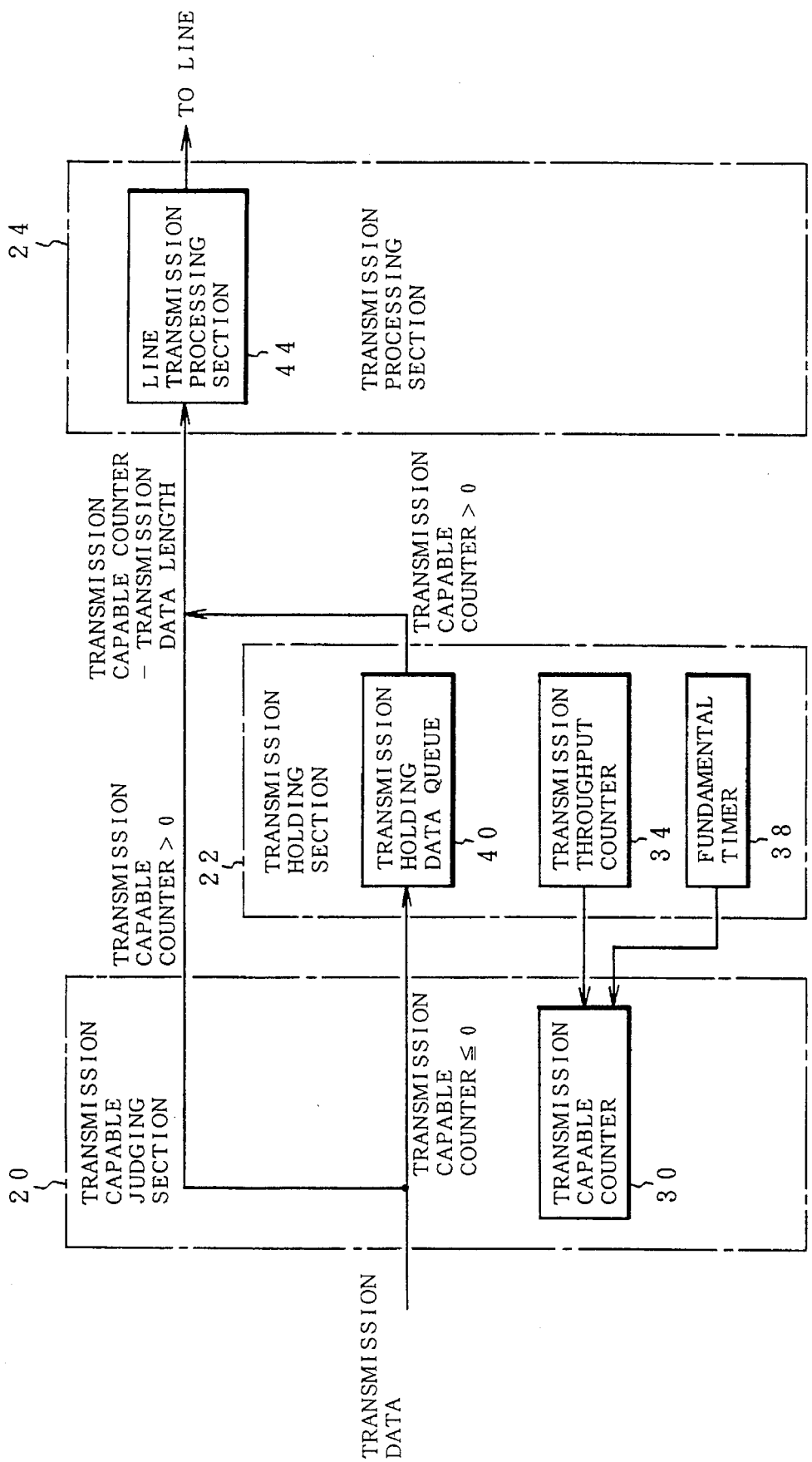
FIG. 5 is a functional block diagram of the embodiment of FIG. 1.

FIG. 5 shows functions of the transmission judging process when there is the transmission request in FIG. 2 and the time-up process at the time of the time-up of the fundamental timer 38. When the transmission data is given on the basis of the transmission request, the transmission capable counter 30 at that time is referred. When the count value C1 is larger than 0, namely, when it is positive, it is judged that the transmission can be performed. The data is sent to the line transmission processing section 44, thereby starting the transmitting operation to the network. In this case, the count value C1 of the transmission capable counter 30 is updated to the value obtained by subtracting the data length Cs of the transmission data from the count value C1. On the other hand, when there is the transmission request, if the count value C1 of the transmission capable counter 30 is equal to or less than 0, namely, when it is equal to 0 or negative, the data is not transmitted to the network but is stored in the transmission holding data queue 40 and is held. When the fundamental timer 38 times out, the transmission capable counter 30 is updated on the basis of the count value C2 corresponding to the data length which gives the transmission throughput adapted to the demodulation state of the network of the transmission throughput counter 34. In such an updating, when the count value C1 of the transmission capable counter 30 is larger than 0, namely, positive, the count value C2 of the transmission throughput counter 34 is directly preset. When the count value C1 of the transmission capable counter 30 is equal to or less than 0, namely, when it is equal to 0 or negative, the value (C1+C2) obtained by adding the count value C2 of the transmission throughput counter 34 to the present count value C1 of the transmission capable counter 30 is set to a new count value C1.

Figure 6:
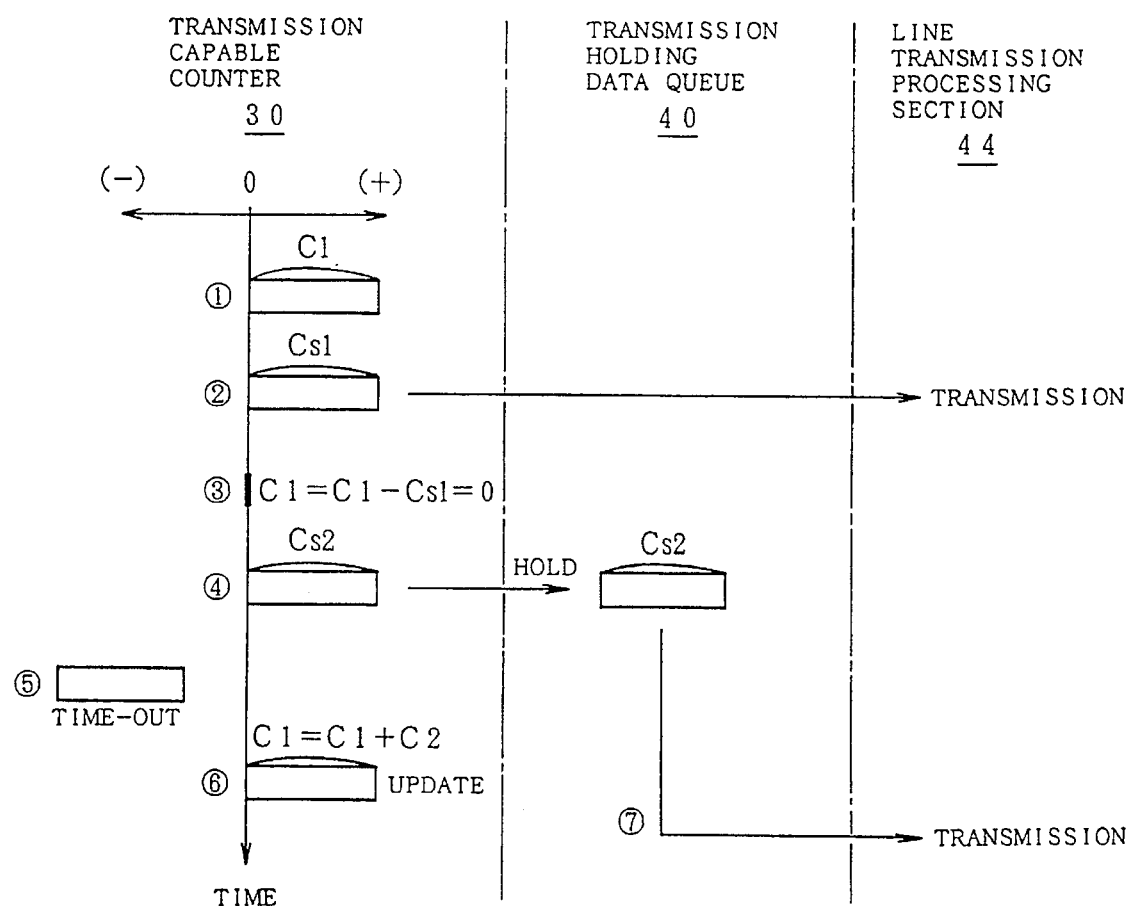
FIG. 6 is an explanatory diagram of a transmission judging process in the case where a value of a transmission capable counter and a transmission data length are equal.

FIG. 6 shows time-dependent changes of the transmission judging process in the functional block of FIG. 5 with respect to the transmission capable counter 30, transmission holding data queue 40, and line transmission processing section 44. First, it is now assumed that the positive count value C1 has been set in the transmission capable counter 30 as shown in (1). In this state, when a transmission request of a data length Cs1 of (2) is performed, since the count value C1 of the transmission capable counter 30 is positive as shown in (1) in this instance, the transmission data is directly sent to the line transmission processing section 44 and the transmission to the network is started. In association with the transmission start, as shown in (3), the count value C1 of the transmission capable counter 30 is reduced to the value obtained by subtracting the transmission data length Cs1 from the count value C1 so far. In this case, now assuming that C1−Cs1, C1=0. Subsequently, when it is assumed that a transmission request of a data length Cs2 of (4) is performed, since the count value C1 of the transmission capable counter 30 in this instance is equal to 0 as shown in (3), the transmission data of the data length Cs2 is held in the transmission holding data queue 40. When the fundamental timer 38 times out in (5), the count value C1 of the transmission capable counter 30 is updated in (6) and becomes a positive value. Since the holding transmission data exists in the queue 40, the count value C1 of the counter 30 after the updating is checked. Since it is positive in this instance, the holding transmission data is taken out and the transmission to the network is started from the line transmission processing section 44.

Figure 7:
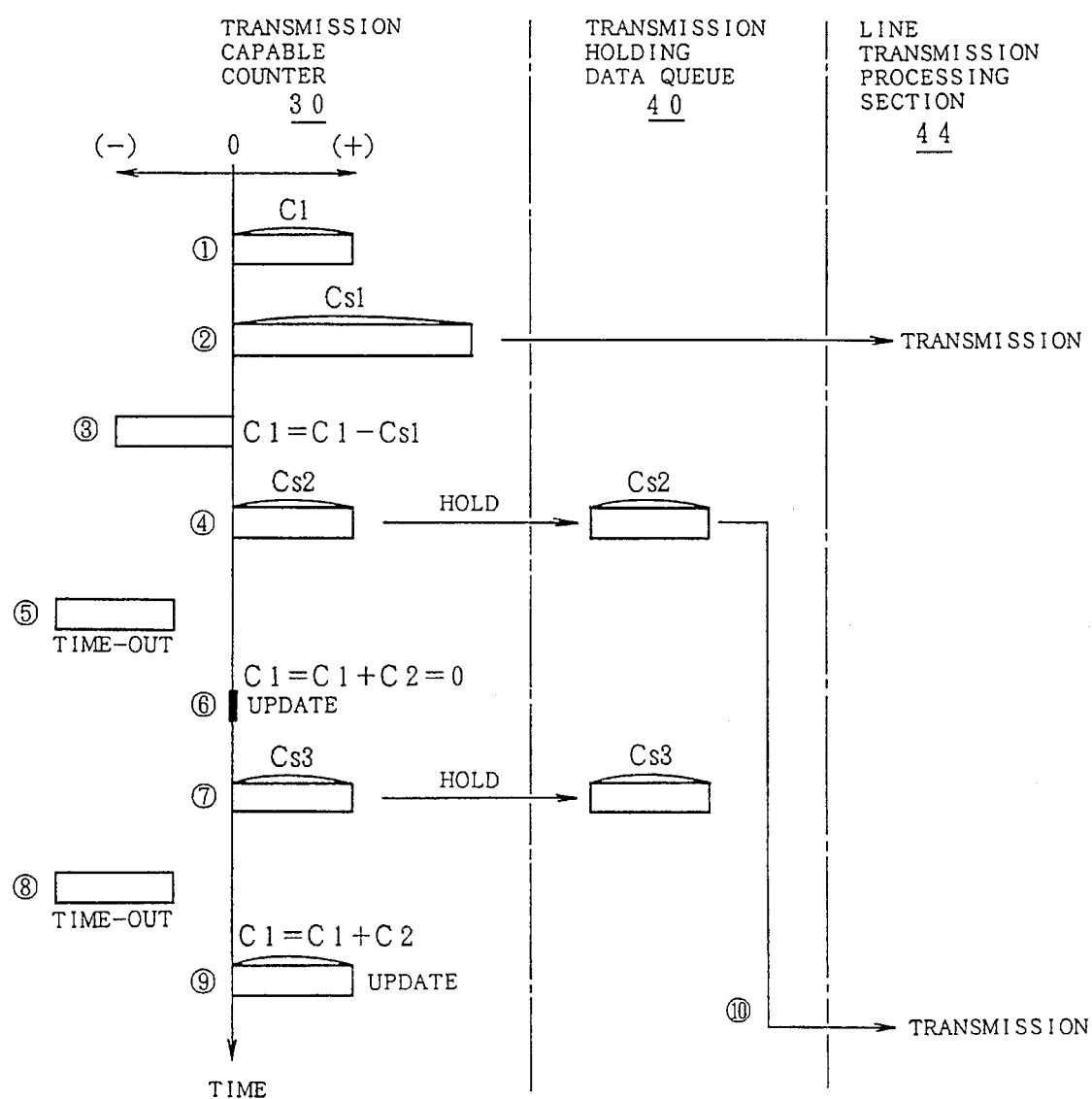
FIG. 7 is an explanatory diagram of a transmission judging process in the case where the transmission data length is larger than the value of the transmission capable counter.

FIG. 7 shows a time-dependent elapse of the operation when the count value C1 of the transmission capable counter 30 is positive in the functional block of FIG. 5 and the transmission request of the data having a data length longer than the count value C1 is performed. First as shown in (1), the count value C1 of the counter 30 is positive. In this state, as shown in (2), when the transmission request of the transmission data having the data length Cs1 longer than the count value C1 is executed, the transmission data is directly sent to the line transmission processing section 44 and the transmission to the network is started. At the same time, as shown in (3), the count value C1 of the transmission capable counter 30 is updated to a value obtained by subtracting the data length Cs1 from the count value C1. In this case, the count value C1 after the updating has a negative value. Therefore, when the transmission request of the data having the data length Cs2 of the half of the data length Cs1 in (2) is executed in (4), since the count value C1 is negative, the data is held in the transmission holding data queue 40. After the data was held, when the fundamental timer 38 times out in (5), the count value C1 is updated in (6). In this case, C1=0. Subsequently, when the transmission request of the data having a data length Cs3 is executed in (8), since the count value C1 at this time is equal to 0, the data is held in the queue 40. When the fundamental timer 38 subsequently times out in (9), the count value C1 of the counter 30 is updated and becomes positive as shown in (10). Therefore, the transmission data of a higher priority held in (4) in the two transmission data held in the transmission holding data queue 40 is taken out and the transmission to the network is started from the line transmission processing section 44.

As shown in FIG. 7, when the transmission request of the data of a data length such as to exceed the count value C1 of the transmission capable counter 30 which was updated by presetting the count value C2 of the transmission throughput counter 34 is performed, so long as the value of the counter 30 is positive, the transmission request of the data of the long data length is accepted as it is and the data is transmitted to the network. When the transmission data length is long as mentioned above, the count value of the counter 30 is set to a negative value. The transmission data to which the transmission request was performed is held in the transmission holding data queue 40 until the count value C1 is set to a positive value by the updating in association with the time-out of the fundamental timer. The transmission of the data to the network is not performed. Thus, the transmitting operation adapted to the transmission throughput corresponding to the vergence state of the network is automatically executed.

Figure 8:
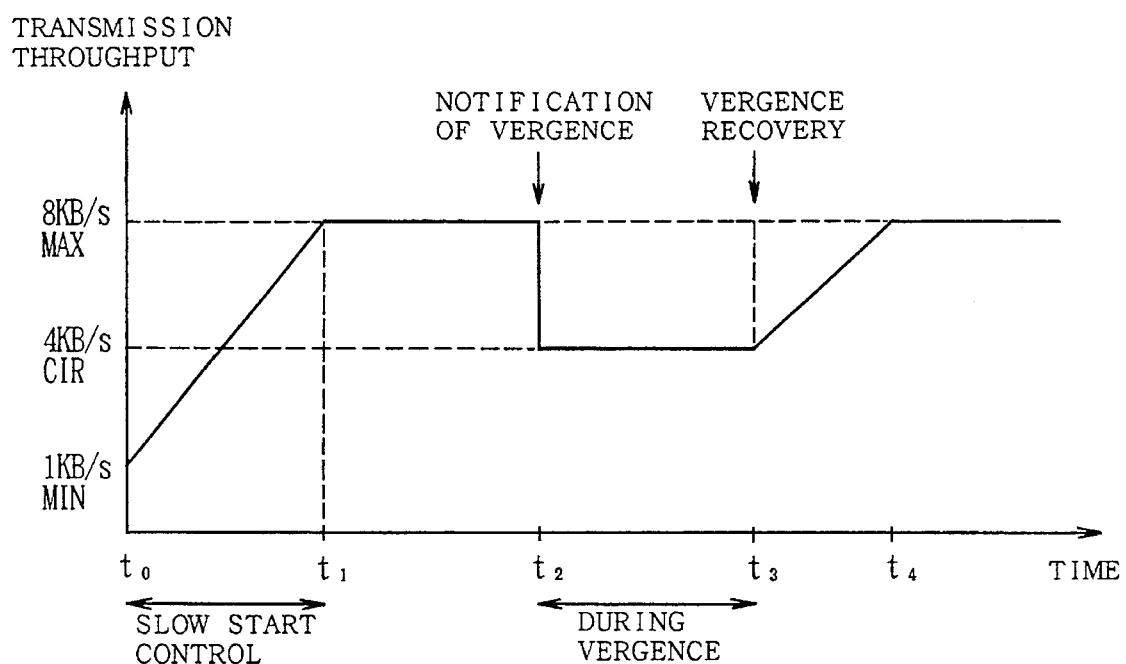
FIG. 8 is an explanatory diagram of a transmission throughput control for a vergence state of a communication network.

FIG. 8 shows an example of the transmission throughput control of the invention for a time-dependent change of the vergence state of the network. First, the maximum transmission throughput of the network is equal to, for example, 8 kB/sec. An authorized information speed CIR that is defined by the lowest communication throughput which is guaranteed in the ordinary state on the network side is equal to 4 kB/sec of the half of the maximum transmission throughput. Further, the minimum transmission throughput MIN is set to 1 kB/sec. First, in a time interval of t0 to t1 at the start due to the system activation, a slow start control is executed in the embodiment. That is, the throughput managing section 36 provided for the transmission holding section 22 in FIG. 2 sets the count value of the minimum transmission throughput of C2=1 kB/sec as a count value C2 to the transmission throughput counter 34 by the initializing process. After that, with the elapse of time, the count value is linearly increased to the maximum transmission throughput MAX=8 kB/sec at a predetermined ratio. By such a slow start control of the transmission throughput as mentioned above, a situation such that the network temporarily enters a vergence state at the time of the activation of the system can be prevented. After time t1, the count value C2 of the transmission throughput counter 30 is set to the count value of the maximum transmission throughput of C2=8 kB/sec. The data transmission is executed at a highest efficiency.

When the vergence notification is received from the network at the time t2 during the data transmission by the high transmission throughput, the throughput managing section 36 reduces the count value C2 of the transmission throughput counter 34 to C2=4 kB/sec as a lowest transmission throughput corresponding to the authorized information speed CIR. Thus, the transmission throughput is reduced to the half, thereby reducing a burden on the network during the vergence. In association with that the transmission throughput is reduced in correspondence to the vergence, when a vergence recovery notification is received from the network at time t3, the transmission throughput is linearly increased to the maximum transmission throughput MAX=8 kB/sec at a predetermined ratio for a time interval of t3 to t4 in a manner similar to the slow start control. A tracking precision of the transmission throughput for the vergence state of the network can be realized by setting the set time of the fundamental timer 38 to decide the updating period of the transmission capable counter 30 to a small value. For example, in the case where the data communicating apparatus sets the transmission data length 4 kB adapted to the authorized information speed CIR of the network to a reference transmission data length to decide the timer set time, the set time of the fundamental timer is set to 1 second. The set time can be also set to a value other than 1 second. For example, it can be also set to 0.5 second of the half of 1 second. On the contrary, when the set time of the fundamental timer 38 is set to a too long time, the transmission is concentrated to a certain specific time zone in the updating period of the transmission capable counter 30 by the fundamental timer and a variation in transmission throughput increases. Therefore, it is desirable to reduce the set time as short as possible.

Figure 9:
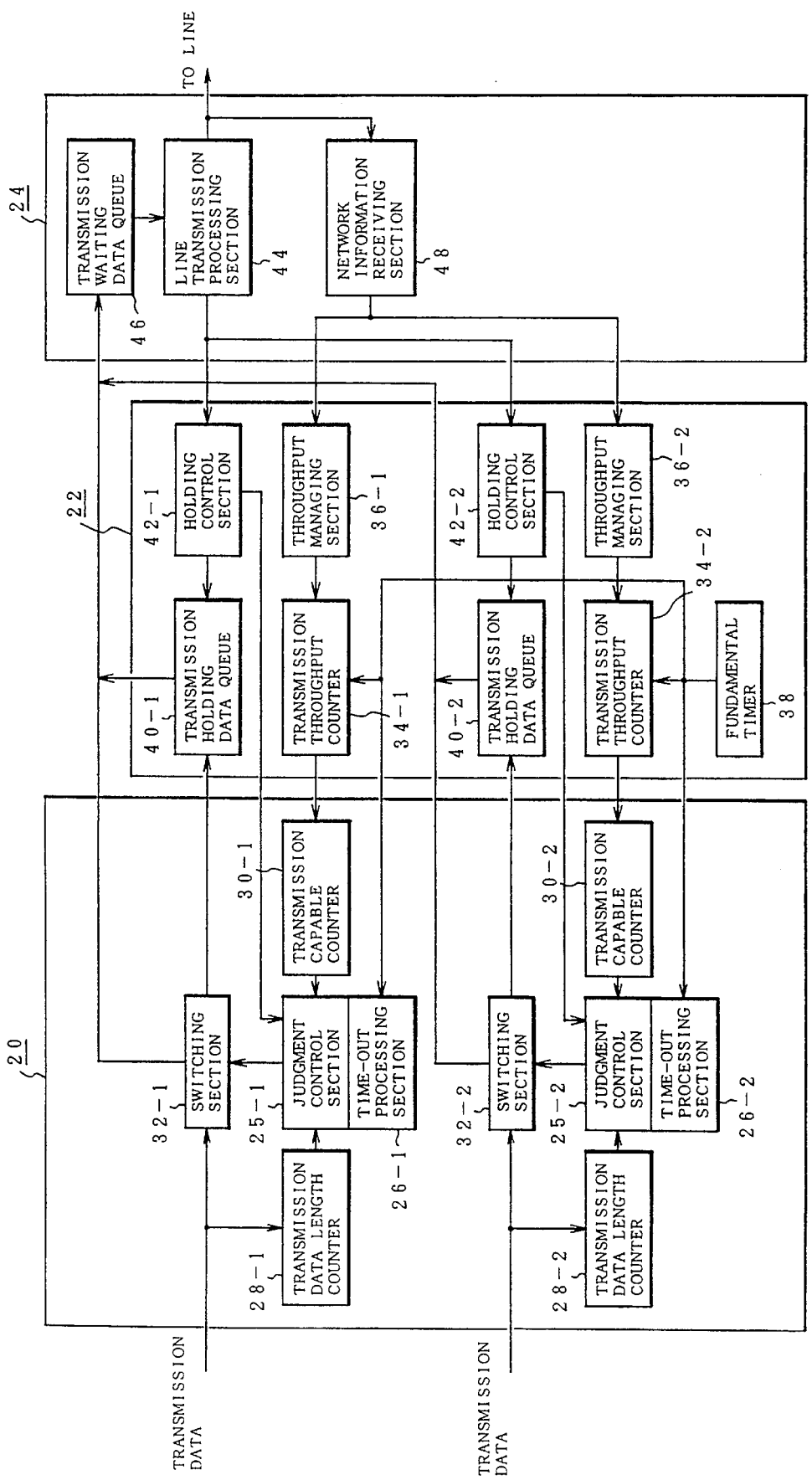
FIG. 9 is a block diagram of another embodiment of the invention.

FIG. 9 shows the second embodiment of the invention and relates to the case where two control systems of the transmission throughput are provided for one data communicating apparatus as an example. The reason why a plurality of systems of the transmission throughput are provided as mentioned above is because, for example, as shown in FIG. 10, the data communicating apparatus 12 on the transmission side can form a communication connection between a plurality of data communicating apparatuses 16-1 to 16-3 on the reception side through the frame relay/network 10. That is, although the data communicating apparatus 12 on the transmission side is physically connected to the frame relay/network 10 by one line, a plurality of lines are logically formed by multiple-using one physical line by a time-divisional manner. Every logical line, communication connections with the data communicating apparatuses 16-1 to 16-3 on the reception side are established in the frame relay/network 10. With respect to the data transmission in which a plurality of communication connections are established in the network as mentioned above, the transmission throughput control systems of the number corresponding to the communication connections which can be established are provided for the data communicating apparatus 12 on the transmission side. The transmission throughput is controlled every communication connection.

FIG. 9 shows the case where two transmission throughput control systems are provided as an example. The fundamental timer 38 of the transmission holding section 22 and the line transmission processing section 44 and network information receiving section 48 of the transmission processing section 24 are provided as common sections. As other processing sections, two systems are independently provided every transmission throughput control system. Further, a transmission waiting data queue 46 is newly added at the front stage of the line transmission processing section 44 provided for the transmission processing section 24. The processing operation for a transmission throughput control in each system is substantially the same as that in case of one system shown in FIG. 2.

Figure 10:
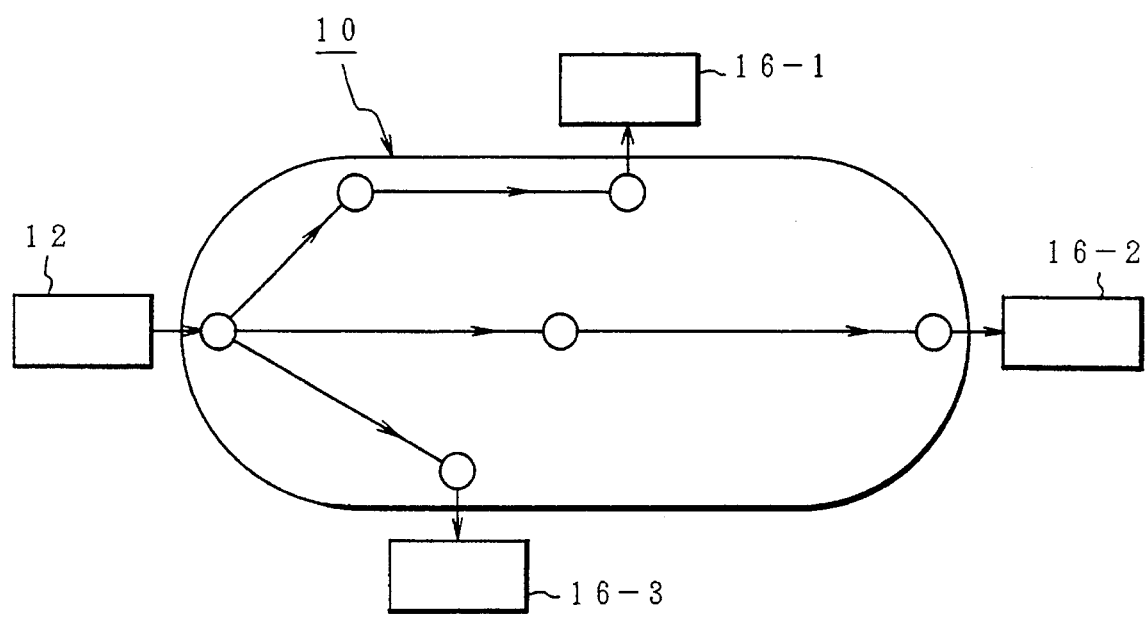
FIG. 10 is an explanatory diagram of a network to which the embodiment of FIG. 9 is applied.
Figure 11:
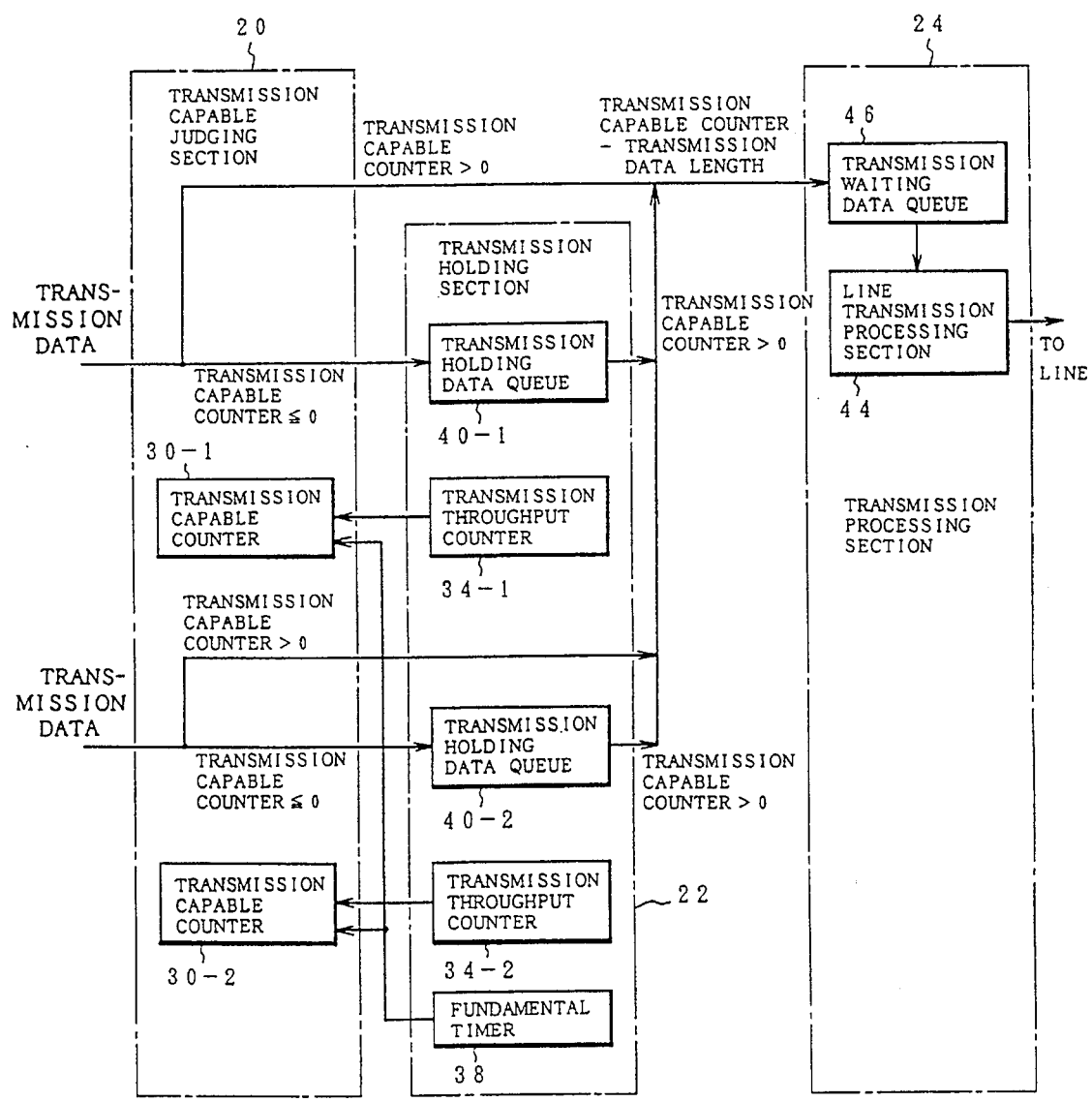
FIG. 11 is a functional block diagram of the embodiment of FIG. 9.

FIG. 11 shows a functional block in case of providing two systems as a transmission throughput control system in FIG. 10. When a transmission request occurs in each system, count values of transmission capable counters 30-1 and 30-2 are checked. When they are positive, the data is transmitted from the line transmitting section 44 to the network via the transmission waiting data queue 46 and the count values are updated to the value obtained by subtracting the transmission data length from the value of the transmission capable counter 30-1. When the count values of the counters 30-1 and 30-2 are equal to 0 or negative, the data is not transmitted to the network but is stored in transmission holding data queues 40-1 and 40-2 and is held. When the fundamental timer 38 times out, the count values of the transmission capable counters 30-1 and 30-2 are updated on the basis of the count values C2 of transmission throughput counters 34-1 and 34-2. That is, when the count values of the transmission capable counters 30-1 and 30-2 are positive, the count values of the transmission throughput counters 34-1 and 34-2 are preset as they are. As for the count values of the transmission throughput counters 34-1 and 34-2, line connections in the network differ as shown in FIG. 10 and a vergence state also differs every line connection. Therefore, a count value of a peculiar transmission throughput corresponding to each vergence state is set. The values of the transmission capable counters 30-1 and 30-2 are updated to the count values peculiar to the communication connections. In such a counter updating as mentioned above, when the count values of the transmission capable counters 30-1 and 30-2 are positive, the count values of the transmission throughput counters 34-1 and 34-2 are directly preset. When the count values of the counters 30-1 and 30-2 are equal to 0 or negative, the values obtained by adding the count values of the transmission throughput counters 34-1 and 34-2 to the count values of the transmission capable counters 30-1 and 30-2 are set to new count values, respectively. When the holding transmission data exists after the updating of the transmission capable counters 30-1 and 30-2, the holding transmission data of the highest priority is taken out from the transmission data held in the transmission holding data queues 40-1 and 40-2 under a condition such that the values of the transmission capable counters 30-1 and 30-2 after the updating are positive. The transmission of the extracted transmission data from the line transmission processing section 44 to the network via the transmission waiting data queue 46 is started. Even with respect to the start of the transmission of the holding transmission data, the count values are also updated to the values obtained by subtracting the data length of the holding transmission data of which the transmission was started from the count values of the transmission capable counters 30-1 and 30-2.

As mentioned above, according to the invention, for changes in communication capacity and performance according to the vergence state of the communication network which doesn't perform the flow control as in the frame relay/network, by promptly changing the transmission throughput on the data transmission side, it can be traced to the changes in communication capacity and performance of the network. The occurrence of a data dropout since the transmission throughput of the data communicating apparatus exceeds the communication throughput of the network or a situation such that a retry of the protocol is frequently executed in association with such a data dropout are prevented. The data communication of a high efficiency and a high performance can be executed while making the most of the state of the network without deteriorating the communication performance.

Although the embodiment of FIG. 9 has been shown and described with respect to the case where two transmission throughput control systems are provided as an example, an arbitrary number of control systems can be provided as necessary. Although the embodiments of FIGS. 2 and 9 have been shown as embodiments of the circuit block, those circuit functions can be realized as softwares of the data communicating apparatus using the processor. Further, the present invention is not limited by the numerical values shown in the above embodiments.

What is claimed is:

1. An apparatus for controlling a throughput of transmission data which is transmitted to a network, comprising:

a transmission capable counter indicative of a data length which can be transmitted at the present time point;

a fundamental timer to which an updating period of said transmission capable counter is set and which times out every said updating period;

a transmission throughput counter indicative of a data length which can be transmitted by a communication network between the updating periods of said fundamental timer;

a transmission holding data queue for temporarily holding data which cannot be transmitted;

a line transmission processing section for outputting the transmission data to a physical line of said communication network;

a transmission judgment control section for checking said transmission capable counter when a transmission request is generated, for subtracting a data length of the transmission data to which the transmission request was generated from a count value of said transmission capable counter and starting a transmitting process by said line transmission processing section when said count value is positive, and for holding the transmission data in said transmission holding data queue when the value of said transmission capable counter is negative or is equal to 0; and a time-out processing section for presetting a count value of said transmission throughput counter to said transmission capable counter when the value of said transmission capable counter is positive at the time of a timeout of said fundamental timer, for executing a counter updating to add the value of said transmission throughput counter to the value of said transmission capable counter when the value of said transmission capable counter is negative or is equal to 0, for taking out the transmission data of a highest priority among the transmission data held when the value of said transmission capable counter is positive as a result of said process and when the holding transmission data exists in said transmission holding data queue, for subtracting a data length of said extracted transmission data from the value of said transmission capable counter, and for starting a transmitting process by said line transmission processing section.

2. An apparatus according to claim 1, wherein after completion of the transmission to a physical line of the data based on the transmission request, if the holding transmission data exists in said transmission holding data queue, said line transmission processing section takes out the transmission data of the highest priority among the holding transmission data and subtracts the data length of said extracted transmission data from the value of said transmission capable counter and starts the transmission.

3. An apparatus according to claim 1, wherein a plurality of sets each comprising said transmission capable counter, said transmission throughput counter, said transmission holding data queue, said transmission judgment control section, and said time-out processing section are provided, and further a transmission waiting data queue is provided at the front stage of said line transmission processing section, thereby enabling the transmission throughput to be controlled on a unit basis of a plurality of communication systems.

4. An apparatus according to claim 1, wherein said fundamental timer is a timer whose set time can be changed and automatically sets a transmission time of the maximum transmission data length in a unit communication system by said communication network to a timer value.

5. An apparatus according to claim 1, wherein said transmission throughput counter has a throughput managing section to increase or decrease a value of a self counter, in the case where a high transmission throughput is necessary and the throughput can be increased, the value of said transmission throughput counter is increased, or in the case where a vergence notification is received from said communication network and the transmission throughput is reduced, the value of said transmission throughput counter is decreased.

6. An apparatus according to claim 5, wherein said throughput managing section measures the vergence notification received from said communication network for a designated measuring period of time, the number of retry times due to a data dropout at the time of a vergence, in which an adjustment of the transmission throughput is necessary and determines a degree of increase or decrease of the value of said transmission throughput counter on the basis of said measured information.

7. An apparatus according to claim 6, wherein said throughput managing section increases or decreases the value of said transmission throughput counter at a predetermined ratio or on a unit basis of a predetermined value.

8. A method of controlling a throughput of transmission data which is transmitted to a network, comprising:

a transmission judging step of checking a value of a transmission capable counter indicative of a data length which can be transmitted at a present time point when a transmission request is generated, subtracting a data length of the transmission data to which the transmission request was generated from the value of said transmission capable counter and starting a transmitting process when said value is positive, and holding the transmission data into a transmission holding data queue when the value of said transmission capable counter is negative or is equal to 0;

a counter updating step of presetting a value of a transmission throughput counter to said transmission capable counter when the value of said transmission capable counter is positive every time-out of a fundamental timer to which an updating period has been set, and adding the value of said transmission throughput counter to the value of said transmission capable counter when the value of said transmission capable counter is negative or is equal to 0; and a holding data transmission step of subtracting a data length of the transmission data of the highest priority among the holding transmission data from the value of said transmission capable counter and starting a transmitting process in the case where the value of said transmission capable counter is positive as a result of the process in said counter updating step and in the case where the holding transmission data exists in said transmission holding data queue.

9. A method according to claim 8, wherein in said holding data transmitting step, after completion of the transmission of the data to a physical line based on the transmission request, if the holding transmission data exists in said transmission holding data queue, the transmission data of the highest priority among the holding transmission data is taken out, a data length of said extracted transmission data is subtracted from the value of said transmission capable counter, and the transmission is started.

10. A method according to claim 8, wherein a plurality of sets each comprising said transmission capable counter, said transmission throughput counter, and said transmission holding data queue are provided and, further, a transmission waiting data queue to store transmission waiting data is provided, thereby enabling the transmission throughput to be controlled on a unit basis of a plurality of communication systems.

11. A method according to claim 8, wherein said fundamental timer is a timer whose set time can be changed and automatically sets a transmission time of the maximum transmission data length in a unit communication system by said communication network to a timer value.

12. A method according to claim 8, wherein said transmission throughput counter has a throughput managing step of increasing or decreasing a value of a self counter, in the case where a high transmission throughput is necessary and the throughput can be increased, the value of said transmission throughput counter is increased, and in the case where a vergence notification is received from said communication network and the transmission throughput is reduced, the value of said transmission throughput counter is decreased.

13. A method according to claim 12, wherein in said throughput managing step, the vergence notification received from said communication network for a designated measuring period of time, the number of retry times due to a data dropout at the time of a vergence, in which an adjustment of the transmission throughput is necessary is measured, and a degree of increase or decrease of the value of said transmission throughput counter is determined on the basis of said measured information.

14. A method according to claim 13, wherein in said throughput managing step, the value of said transmission throughput counter is increased or decreased at a predetermined ratio or on a unit basis of a predetermined value.

15. An apparatus for controlling a throughput of transmission data which is transmitted to a network, comprising:

a transmission capable counter indicative of a data length which can be transmitted at the present time point;

a fundamental timer to which an updating period of said transmission capable counter is set and which times out every said updating period;

a transmission throughput counter indicative of a data length which can be transmitted by a communication network between the updating periods of said fundamental timer;

a transmission holding data queue for temporarily holding data which cannot be transmitted;

a line transmission processing section for outputting the transmission data to a physical line of said communication network;

a transmission judgment control section for checking said transmission capable counter when a transmission request is generated, for subtracting a data length of the transmission data to which the transmission request was generated from a count value of said transmission capable counter and starting a transmitting process by said line transmission processing section when said count value is positive, and for holding the transmission data in said transmission holding data queue when the value of said transmission capable counter is negative; and a time-out processing section for presetting a count value of said transmission throughput counter to said transmission capable counter when the value of said transmission capable counter is positive at the time of a time-out of said fundamental timer, for executing a counter updating to add the value of said transmission throughput counter to the value of said transmission capable counter when the value of said transmission capable counter is negative, for taking out the transmission data of a highest priority among the transmission data held when the value of said transmission capable counter is positive as a result of said process and when the holding transmission data exists in said transmission holding data queue, for subtracting a data length of said extracted transmission data from the value of said transmission capable counter, and for starting a transmitting process by said line transmission processing section.

16. A method of controlling a throughput of transmission data which is transmitted to a network, comprising:

a transmission judging step of checking a value of a transmission capable counter indicative of a data length which can be transmitted at a present time point when a transmission request is generated, subtracting a data length of the transmission data to which the transmission request was generated from the value of said transmission capable counter and starting a transmitting process when said value is positive, and holding the transmission data into a transmission holding data queue when the value of said transmission capable counter is negative;

a counter updating step of presetting a value of a transmission throughput counter to said transmission capable counter when the value of said transmission capable counter is positive every time-out of a fundamental timer to which an updating period has been set, and adding the value of said transmission throughput counter to the value of said transmission capable counter when the value of said transmission capable counter is negative; and a holding data transmission step of subtracting a data length of the transmission data of the highest priority among the holding transmission data from the value of said transmission capable counter and starting a transmitting process in the case where the value of said transmission capable counter is positive as a result of the process in said counter updating step and in the case where the holding transmission data exists in said transmission holding data queue.

* * * * *